(12) United States Patent
Gupta et al.

(10) Patent No.: US 9,398,795 B2
(45) Date of Patent: Jul. 26, 2016

(54) AIRLINE BAGGAGE TRACKING AND NOTIFICATION SYSTEM

(75) Inventors: Amit Gupta, Highland Park, NJ (US); Rashmi Naik, Belle Mead, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 364 days.

(21) Appl. No.: 13/416,835

(22) Filed: Mar. 9, 2012

(65) Prior Publication Data

US 2013/0234849 A1    Sep. 12, 2013

(51) Int. Cl.
| | |
|---|---|
| G08B 1/08 | (2006.01) |
| G08B 5/22 | (2006.01) |
| G08B 25/00 | (2006.01) |
| B60R 25/10 | (2013.01) |
| G08G 1/123 | (2006.01) |
| A45C 13/18 | (2006.01) |
| G06Q 10/08 | (2012.01) |
| A45C 13/42 | (2006.01) |

(52) U.S. Cl.
CPC ............ *A45C 13/18* (2013.01); *G06Q 10/0833* (2013.01); *A45C 13/42* (2013.01)

(58) Field of Classification Search
CPC ............ G06Q 10/083; G06Q 10/0833; G06Q 30/0261; G08G 1/20; B60R 25/102; G01S 13/825; G07B 15/00; G08B 21/24; B65G 47/50; G01C 21/343; G06F 17/30867
USPC ........................ 340/539.11, 539.19
See application file for complete search history.

(56) References Cited

U.S. PATENT DOCUMENTS

| | | | | |
|---|---|---|---|---|
| 5,537,460 | A * | 7/1996 | Holliday et al. | ........... 455/435.1 |
| 5,627,517 | A * | 5/1997 | Theimer et al. | ............ 340/572.1 |
| 5,842,555 | A * | 12/1998 | Gannon | ................. B64F 1/368 |
| | | | | 198/349.5 |
| 5,892,441 | A * | 4/1999 | Woolley | ................ G01S 5/0289 |
| | | | | 235/384 |
| 6,014,628 | A * | 1/2000 | Kovarik, Jr. | ....................... 705/5 |
| 6,240,362 | B1 * | 5/2001 | Gaspard, II | .................. 701/410 |
| 6,353,390 | B1 * | 3/2002 | Beri | ................... G08B 13/1427 |
| | | | | 340/572.1 |
| 6,415,207 | B1 * | 7/2002 | Jones | ............................... 701/1 |
| 6,462,656 | B2 * | 10/2002 | Ulrich et al. | ............... 340/539.1 |
| 7,243,845 | B2 * | 7/2007 | Cash et al. | .................... 235/384 |
| 7,420,470 | B2 * | 9/2008 | Koch et al. | ................. 340/572.4 |
| 7,916,025 | B2 * | 3/2011 | Locker et al. | ............. 340/572.1 |
| 8,081,072 | B2 * | 12/2011 | Scalisi et al. | ............ 340/539.13 |
| 8,253,557 | B2 * | 8/2012 | Ani et al. | ................. 340/539.13 |

(Continued)

OTHER PUBLICATIONS

Author: Lufthansa Airlines, Title: Flight Status, Date Feb. 17, 2012, Publisher: www.Lufthansa.com, Pertinent Page: All.*

(Continued)

*Primary Examiner* — Steven Lim
*Assistant Examiner* — Muhammad Adnan

(57) ABSTRACT

An airport baggage tracking and notification system may include a baggage tracking system and a baggage location notification system. The baggage tracking system may be configured to track when baggage at an airport has arrived at and/or has departed from one or more locations at an airport, such as a check in area, a baggage sorting area, within an airplane, a baggage pickup area, and/or a passenger exit at the airport. The baggage location notification system may be configured to cause a notification to be automatically delivered to a passenger that is transporting the baggage, a passenger transportation service, and/or others contemporaneously with when the baggage has arrived at and/or departed from each of the locations indicating that the baggage has arrived at or departed from each location.

18 Claims, 7 Drawing Sheets

(56) References Cited

U.S. PATENT DOCUMENTS

| | | | |
|---|---|---|---|
| 2002/0143670 A1* | 10/2002 | Cushing | G06Q 10/08 705/28 |
| 2003/0137435 A1* | 7/2003 | Haddad et al. | 340/994 |
| 2003/0143944 A1* | 7/2003 | Martin et al. | 455/3.01 |
| 2006/0000903 A1* | 1/2006 | Barry | G06Q 10/02 235/385 |
| 2007/0229272 A1* | 10/2007 | Cash et al. | 340/572.1 |
| 2010/0019895 A1* | 1/2010 | Gurman | 340/539.11 |
| 2010/0076796 A1* | 3/2010 | Klein | G06Q 10/02 705/5 |
| 2010/0289646 A1* | 11/2010 | Raniere | 340/572.1 |
| 2011/0148625 A1* | 6/2011 | Velusamy | 340/539.13 |
| 2011/0225257 A1* | 9/2011 | Tilden et al. | 709/207 |
| 2011/0267192 A1* | 11/2011 | Goldman et al. | 340/568.1 |
| 2012/0026017 A1* | 2/2012 | Horstemeyer | 340/994 |
| 2013/0150028 A1* | 6/2013 | Akins et al. | 455/427 |

OTHER PUBLICATIONS

Title: Traceable Air Baggage Handling System Based on RFID Tags in the Airport, Date: Feb. 18, 2008, Publisher: www.jtaer.com, Pertinent Page: Entire Document.*

Andreatta, G. et al. 2007. Evaluating terminal management performances using SLAM: The case of Athens International Airport. In Computers & Operations Research, vol. 34, No. 6, pp. 1532-1550, 2007.

Martin, T.W. 2011. Delta Lets Fliers Track Bags. Wall Street Journal, Apr. 23, 2011, 2 pages. (Article downloaded Jan. 23, 2012 at http://online.wsj.com/article/SB10001424052748703907004576279303018796720.html?KEYWORDS=delta+track+bag).

Wessel, R. 2009. Munich Airport Says RFID Improves Dolly Management. RFID Journal, Oct. 21, 2009, 2 pages (Article downloaded Jan. 23, 2012 at http://www.rfidjournal.com/article/view/5316).

* cited by examiner

  
*Fig. 7A*   *Fig. 7B*   *Fig. 7C*
 
*Fig. 7D*   *Fig. 7E*

AIRLINE BAGGAGE TRACKING AND NOTIFICATION SYSTEM

TECHNICAL FIELD

This disclosure relates to airports, airline baggage, passengers, passenger transportation services, and to wireless mobile communication devices.

DESCRIPTION OF RELATED ART

Mistakes, delays, and thefts during the handling of baggage at airports are a continuing and growing problem. For example, baggage is sometimes placed on the wrong flight. Unfortunately, a passenger is usually not aware of this mistake until after the passenger arrives at his or her destination. This can substantially delay the time when corrective measures are taken and, as a consequence, when the passenger receives his or her misdirected baggage.

The amount of time that it takes to deliver baggage from an arriving flight to the baggage pickup area can also vary greatly. Sometimes, it may be only a few minutes. Other times, it can exceed an hour. Unfortunately, the passenger and any airport transportation service that the passenger may be utilizing may be unaware of how long it will take for the baggage to arrive at the baggage pickup area. As a consequence, the passenger and/or the airport transportation service may waste time waiting at a baggage pickup area for baggage that will not arrive for some time, instead of using that time more wisely doing other things.

Baggage is also sometimes mistakenly or deliberately taken by someone other than the passenger. However, the passenger may not become aware of this until sometime later when arrival of the baggage at the designated pickup area appears to have been delayed unduly. In the meantime, it may be too late to catch the other person who has taken the baggage.

A solution to these problems has long since been needed.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIGS. 7A-7E illustrate examples of notifications that are sequentially issued by the baggage tracking and notification system at different stages of the tracking process for an incoming airline flight.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
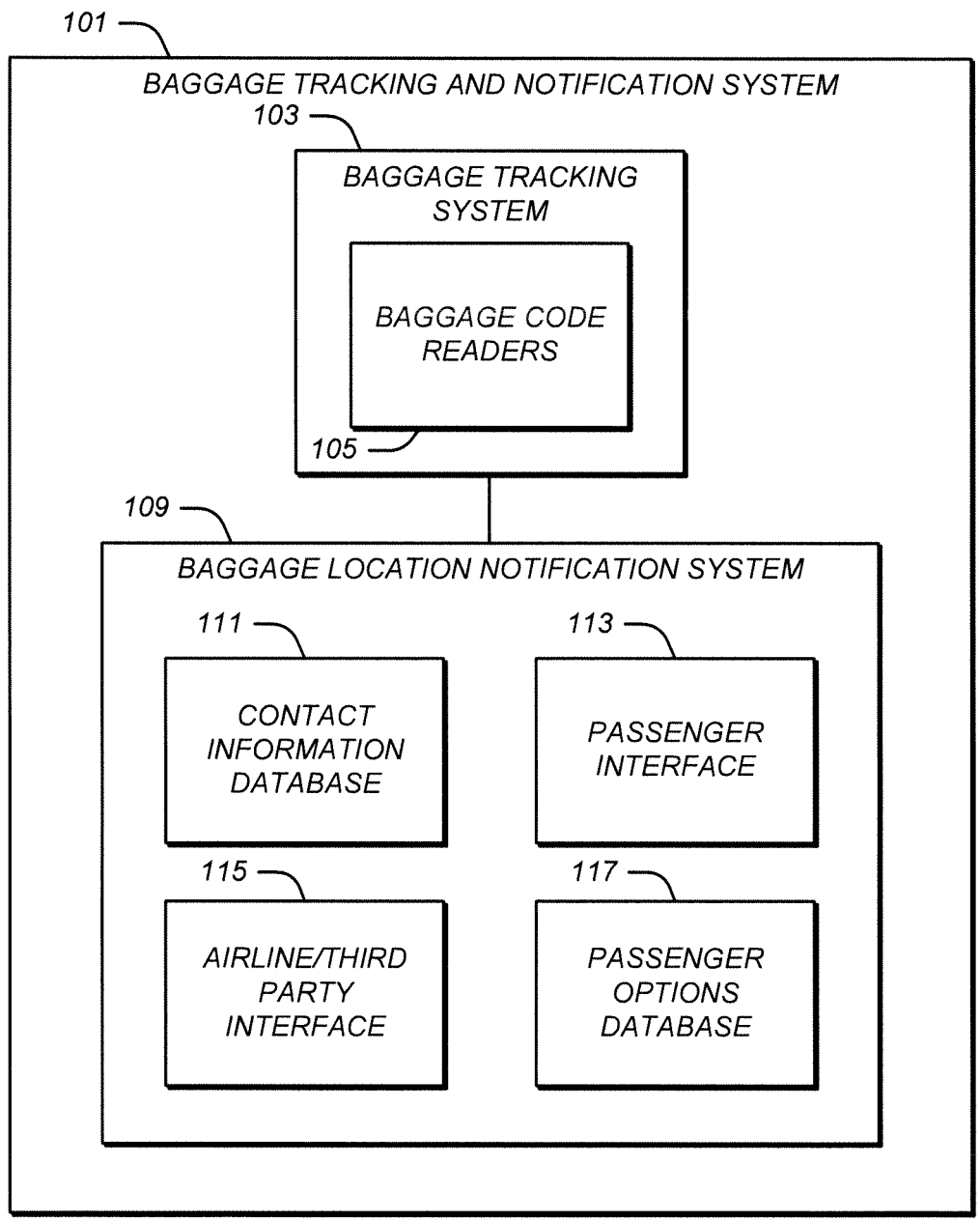
FIG. 1 illustrates an example of a baggage tracking and notification system.

FIG. 1 illustrates an example of a baggage tracking and notification system 101. This system allows baggage to be continuously tracked in real time through multiple individual locations from, and stages of, the baggage's single trip. The single trip may have one or more individual legs in which the passenger and baggage change planes. Thus, tracking may occur through only those legs having the described tracking ability and, if all legs have this functionality, the baggage may be tracked from when the baggage leaves the passenger's possession (e.g., at check in at the initial airport) to when the passenger picks up the baggage (e.g., at baggage claim of the ultimate destination airport). The baggage tracking and notification system 101 includes a baggage tracking system 103 that has one or more baggage code readers 105 and a baggage location notification system 109 that has a contact information database 111, a passenger interface 113, an airline/third party interface 115, and a passenger options database 117.

The baggage tracking system 103 is configured to track when baggage at an airport has arrived at and/or departed from each of one or more locations at an airport. The locations may be of any type, such as a baggage check-in area, a baggage sorting area, within an airplane, a baggage pickup area, and/or a passenger exit from the airport.

To facilitate this functionality, each piece of baggage is assigned a unique code for tracking purposes. This assignment may be facilitated by attaching a label or tag to the baggage that contains the code or by placing a baggage code device within the baggage that contains the code.

Figure 2A:
FIGS. 2A-2D illustrate examples of different types of coded baggage devices that contain a unique code that can be attached to or placed within baggage.
Figure 2B:
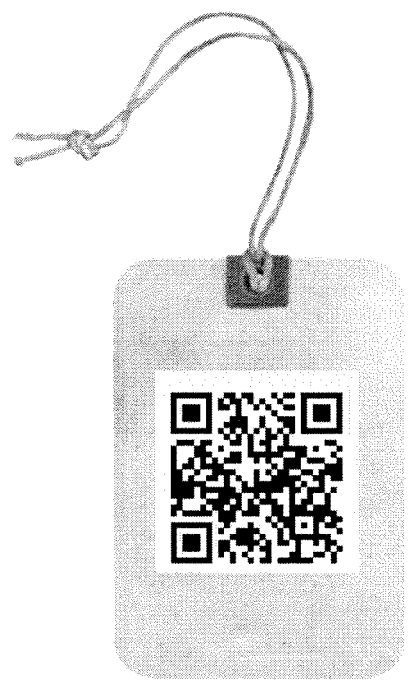
Figure 2C:
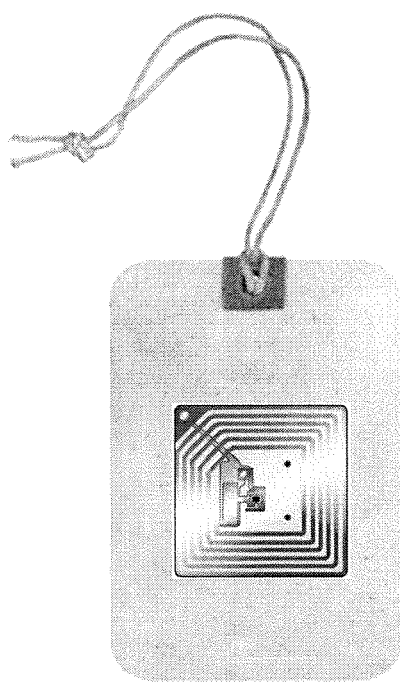
Figure 2D:
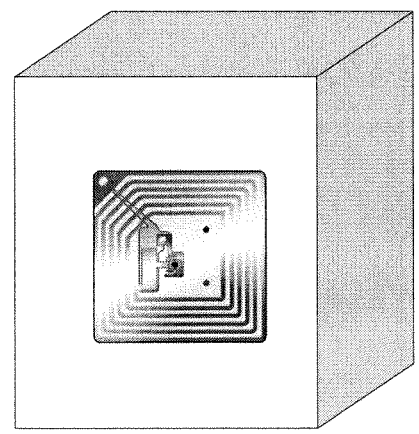

FIGS. 2A-2D illustrate examples of different types of coded baggage devices that contain a unique code and that can be attached to or placed within a piece of baggage. The unique code may be in the form of a barcode that is on a baggage tag that may be attached to the baggage as illustrated in FIG. 2A; a QR code that is on a baggage tag that may be attached to the baggage as illustrated in FIG. 2B; an RFID tag that is on a baggage tag that may be attached to the baggage as illustrated in FIG. 2C; and/or an RFID tag that may be placed within the baggage as illustrated in FIG. 2D.

Other types of coded baggage devices and associated readers could be used instead, such as devices and readers that utilize WiFi. The coded baggage devices may be passive and thus receive any needed operating power from the querying reader. The coded baggage devices could instead be active and thus carry their own needed power, such as a battery or a rechargeable battery.

The coded baggage device may be supplied by an airline or an airport at the time the passenger checks in or at an earlier time such as when the passenger purchases a ticket (e.g., delivered electronically with the ticket or in a separate electronic communication); by a carrier from whom the passenger purchases wireless mobile device services; by a transportation service that transports the passenger to the airport; by a manufacturer, distributor, or retailer of coded baggage devices; and/or by others. Payment may or may not be required. The passenger may or may not be permitted to keep the coded baggage device at the time the passenger departs from the destination airport.

The baggage code readers 105 may be of any type. For example, the baggage code readers 105 may be optical bar code readers, optical QR code readers, and/or RFID tag readers. One or more of the baggage code readers 105 are positioned at each location at which the arrival and/or departure of baggage is to be tracked. Examples of these locations are discussed below.

When using an RFID tag or other types of tags able to be used in automated tracking (e.g., bar code labels), the readers may be positioned at a location that is sufficiently close to the pathway that the baggage will take at that location to ensure that the RFID or other type of tag that is being carried by the baggage will be accurately read. When the baggage may arrive at or depart from the location along several different pathways or along a very wide pathway, multiple RFID or other tag readers may be used at that location covering the full width of all of the pathways.

When using an optical reader, the reader may be positioned at a location and oriented in a manner that allows the reader to optically read the unique code on the coded baggage device as the baggage passes by the reader. In some situations, this may require a baggage handier to manually swipe the unique code by the reader. In other cases, the reader may be held and directed towards the optical baggage code device by baggage personnel. Alternatively, the tag containing the code may be positioned in a predetermined location on the baggage (e.g., placed there by the passenger per instructions or by airline staff) such that when the baggage is conveyed through an automated route, the stationary optical reader is positioned to be able to read the code.

When tracking both the arrival and departure of baggage from a particular location, multiple readers may be used, one at the entryway to the location to track the arrival and one at the exit from the location to track the departure. Multiple readers may be used at the entry and/or exit when needed due to multiple and/or very wide entry or exit pathways.

The baggage location notification system 109 is configured to cause a notification to be automatically sent to a passenger associated with the baggage, a transportation service that is picking the passenger up at a destination airport, and/or others, contemporaneously with when the baggage has arrived at and/or departed from each location that is being tracked by a baggage code reader. Each notification may indicate the location at which the baggage has arrived or from which the baggage has departed as well as possibly the time of each event. Each notification may also include the name of the passenger and/or flight information, such as the flight number, the flight departure airport and/or city, the flight arrival airport and/or city, the anticipated and/or actual departure time, and/or the anticipated and/or actual arrival time.

The baggage location notification system 109 may be configured by the user to send these notifications in real time in any manner. For example, the baggage location notification system 109 may be configured to send one or more of these notifications to a: telephone number of a wireless mobile communication device being carried by the intended recipient in the form of an automated voice message and/or text message; to an e-mail address of the intended recipient in the form of an email message; to an instant messaging service that is being used by the intended recipient in the form of an instant message; and/or to a mobile application that is being run in a wireless mobile communication device that is being carried by the intended recipient. The baggage location notification system 109 may in addition or instead be configured to post one or more of the notifications to a social networking system that is associated with the passenger, such as to the passenger's Twitter™ and/or Facebook™ account. The baggage location notification system 109 may in addition or instead be configured to post one or more of the notifications on a website or other form of data delivery system that is configured to be accessed by the intended recipient(s). The website or other system may be configured to require each intended recipient to authenticate himself or herself before being granted access to the information, such as by requiring a user name and password.

The contact information database 111 may contain information needed to facilitate these notifications in connection with each unique baggage code. For example, the contact information database 111 may contain each unique baggage code and, for each, the name of the passenger that is transporting the baggage that has been assigned the unique baggage code; the phone number of the wireless mobile communication device being carried by each intended recipient; the e-mail address that is being monitored by wireless mobile communication devices being carried by each intended recipient; an identification of an instant messaging service being used by each intended recipient, along with his or her messaging address; and/or an identification of each social networking service and/or website to which notices are to be posted. The contact information database 111 may include data associating one or more tags with one or more names of persons and/or mobile device phone numbers.

The passenger options database 117 is configured to store various passenger options relating to tracking of passenger baggage. The baggage location notification system 109 is configured to implement these options when sending notifications. Examples of these options are discussed below.

Any method may be used for receiving the information in the contact information database 111 and the passenger options database 117. For example, the passenger interface 113 may be configured to allow the passenger to enter all or portions of this information over the telephone using touch tones, by e-mail, through a website, and/or at the airport using a terminal. Similarly, the airline/third party interface 115 may be configured to allow an airline and/or a third party to enter this information using any of these methods. The third party could be a company that issues travel insurance and/or insures baggage against loss.

All or portions of this information may be entered at any time. For example, all or portions of this information may be entered at the time the passenger acquires the coded baggage device, such as from an airline, airport, a wireless mobile communication device carrier, or a coded baggage device supplier. All or portions of this information may in addition or instead be entered at the time the passenger makes an airline reservation, checks in, is waiting for a flight departure, and/or is waiting for baggage to be delivered. All or portions of this information may be extracted from other databases, such as from an airline reservation database, frequent flyer database, and/or a database managed by a coded baggage device supplier.

Figure 3:
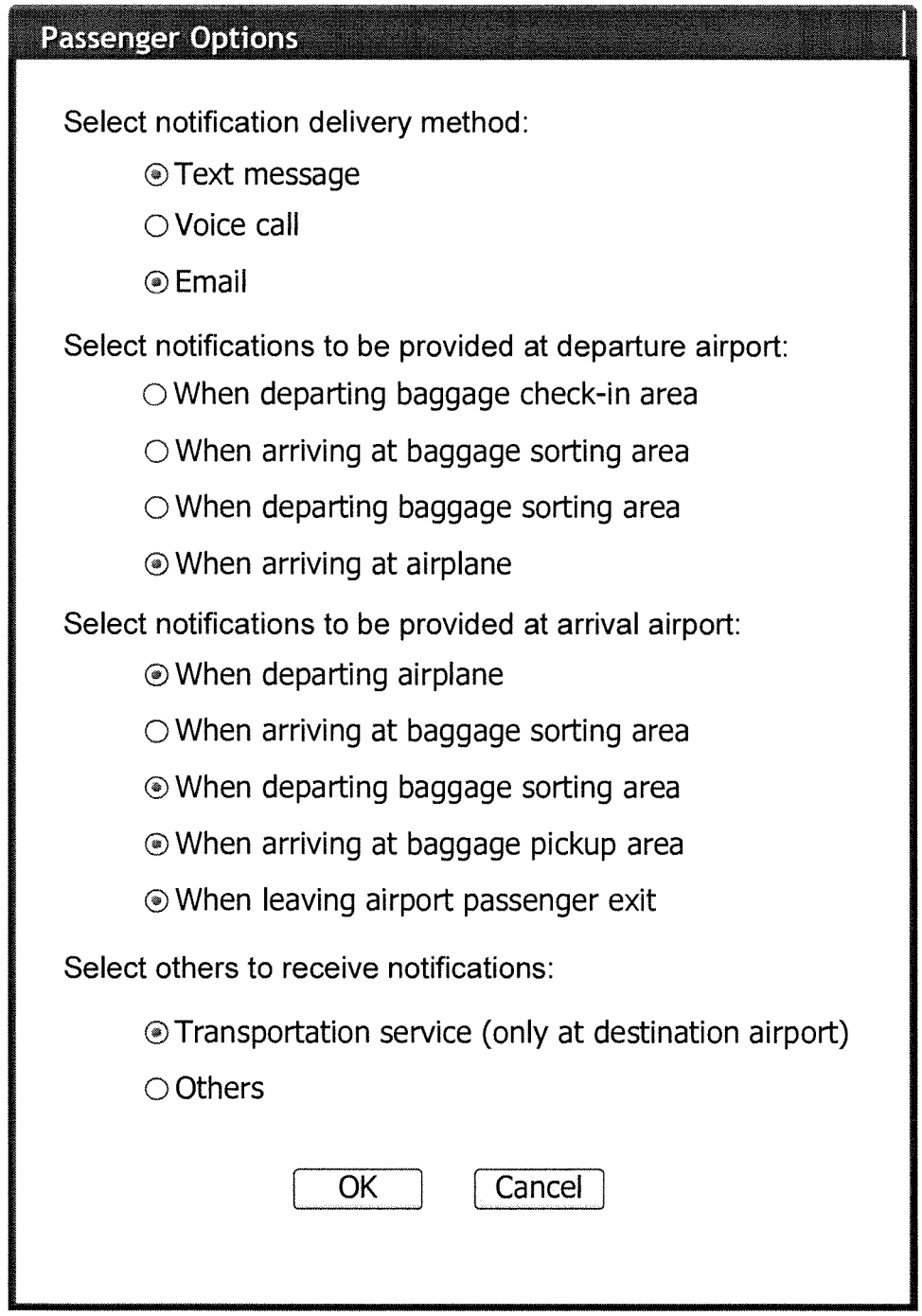
FIG. 3 illustrates an example of a passenger options screen for a baggage tracking and notification system.

FIG. 3 illustrates an example of a passenger options screen for a baggage tracking and notification system. As illustrated in FIG. 3, the passenger may be permitted to select various options relating to tracking the passenger's baggage, such as the methods of notification delivery (e.g., text message, voice call, and/or e-mail); the notifications to be provided at the departure airport (e.g. when departing the baggage check-in area, when arriving at and/or departing from the baggage sorting area, and/or when arriving at the airplane); the notifications to be provided at the arrival airport (e.g., when departing the airplane, arriving at or departing from the baggage storage area, arriving at the baggage pickup area, and/or when leaving an airport passenger exit); and/or whom else is to receive the notifications (e.g., a passenger transportation service and/or others). The methods of notification delivery may in addition or instead include methods other than are illustrated in FIG. 3, such as an instant message or message to a social network account. Although not shown, when a trip has multiple legs, different tracking for each leg of the trip may be able to be independently selected. For example, notification in the intermediate legs of a single trip may be set by the user such that if the baggage changes planes, notification is able to be provided each time the baggage is removed from one plane and/or is stored in another plane. Although the options are illustrated as radio buttons, they could be in any other form, such as checkboxes.

The selection of some of these options may cause other dialogue boxes to open. For example, a dialog box may open after selecting each type of delivery method that requires the entry of an address information relating to the selected method, such as a telephone number when "Text message" or "Voice call" is selected, or an e-mail address when "Email" is selected. Similarly, a dialog box may open seeking similar information (e.g. a selection of delivery methods, notifications to be provided at departure airport, and/or notifications to be provided at arrival airport) when "Transportation service" and/or "Other" is selected.

Figure 4:
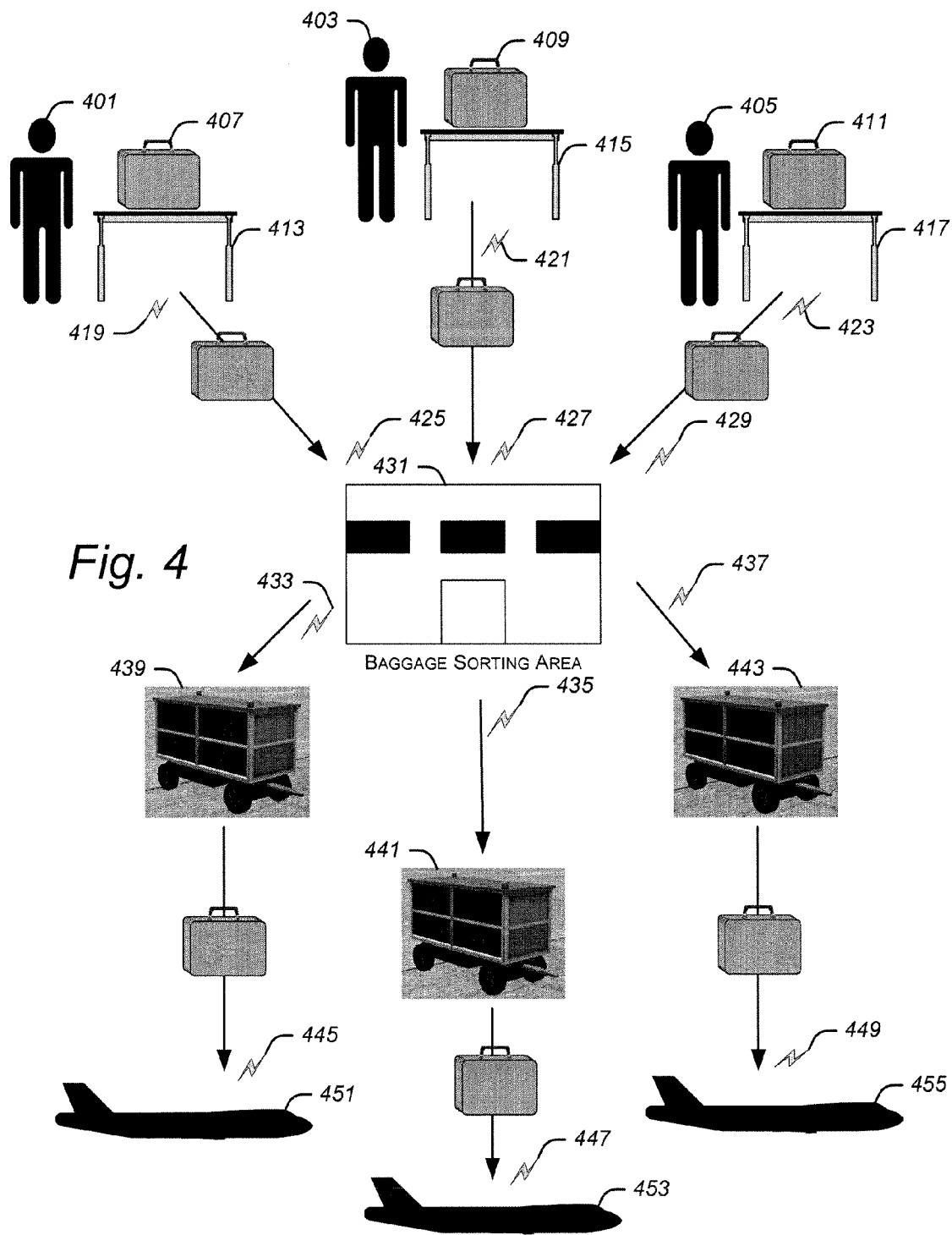
FIG. 4 illustrates an example of a baggage location tracking process for outgoing airline flights.

FIG. 4 illustrates an example of a baggage location tracking process for outgoing airline flights.

As illustrated in FIG. 4, various passengers 401, 403, and 405 check-in baggage 407, 409, and 411 at check-in areas 413, 415, and 417, respectively. At or before this time, the passenger or other person attach the coded baggage device to the baggage or, when appropriate, place it inside the baggage.

Baggage code readers 419, 421, and 423 are located and configured to scan the unique baggage code associated with each piece of baggage, respectively, when each piece of baggage leaves the check-in area. Each reader may be attached to a check-in table, hand carried by a check-in representative, attached to a conveyor system, and/or placed elsewhere. The baggage location notification system 109 may be configured to issue one or more notifications when each piece of baggage has left the check-in area, as detected by a baggage code reader, indicating that the baggage has left the check-in area.

The baggage is then delivered to a baggage sorting area 431. Baggage code readers 425, 427, and 429 are located and configured to scan the unique baggage code associated with each piece of baggage, respectively, when each piece of baggage arrives at the baggage sorting area 431. Each reader may be attached to a conveyor system, carried by baggage sorting personnel, and/or placed elsewhere. The baggage location notification system 109 may be configured to issue one or more notifications when each piece of baggage has arrived at the baggage sorting area 431, as detected by a baggage code reader, indicating that the baggage has arrived at the baggage sorting area. The readers may be configured to send out queries for passive tags or may just listen for a beacon or heartbeat from active tags.

The baggage is then loaded on baggage transport vehicles 439, 441, and 443, respectively. Baggage code readers 433, 435, and 437 are located and configured to scan the unique baggage code associated with each piece of baggage, respectively, when each piece of baggage leaves the baggage sorting area 431. Each reader may be attached to a baggage transport vehicle, hand carried by baggage sorting personnel, and/or placed elsewhere. The baggage location notification system 109 may be configured to issue one or more notifications when each piece of baggage leaves the baggage sorting area, as detected by a baggage code reader, indicating that the baggage has left the baggage sorting area 431.

The baggage is then delivered by a baggage transport vehicle to an airplane 451, 453, or 455, respectively, on which the baggage is then loaded. Baggage code readers 433, 435, and 437 are located and configured to scan the unique baggage code associated with each piece of baggage 407, 409, and 411, respectively, when each piece of baggage arrives at and/or is placed within an airplane. Each baggage code reader may be attached to a baggage transport vehicle, hand carried by baggage loading personnel, attached to an airplane, and/or placed elsewhere. The baggage location notification system 109 may be configured to issue one or more notifications when each piece of baggage arrives at and/or is loaded on the airplane, as detected by a baggage code reader, indicating that the baggage has arrived at and/or been loaded on an airplane.

Figure 5A:
FIGS. 5A-5D illustrate examples of notifications that are sequentially issued by the baggage tracking and notification system at different stages of the tracking process for an outgoing airline flight.
Figure 5B:
Figure 5C:
Figure 5D:

FIGS. 5A-5D illustrate examples of notifications that are sequentially issued by the baggage tracking and notification system 101 at different stages of the tracking process for an outgoing airline flight. FIG. 5A illustrates an example of a notification that is issued when the baggage has just departed from the baggage drop-off area; FIG. 5B illustrates an example of a notification that is issued when the baggage has just arrived at the baggage sorting area; FIG. 5C illustrates an example of a notification that is issued when the baggage has just departed from the baggage sorting area; and FIG. 5D illustrates an example of a notification that is issued when the baggage has been placed aboard the departing flight.

Figure 6:
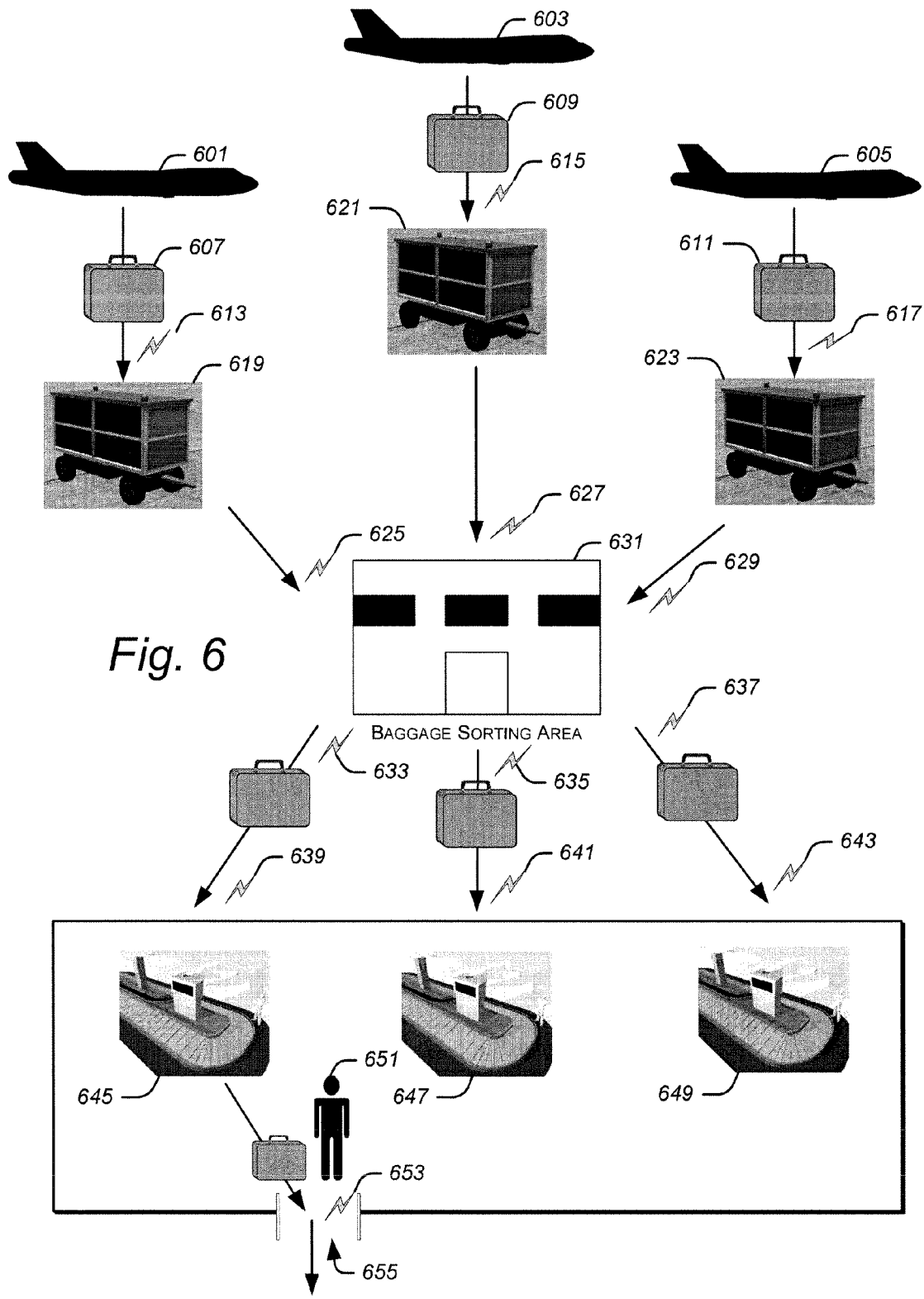
FIG. 6 illustrates an example of a baggage location tracking process for inbound airline flights.

FIG. 6 illustrates an example of a baggage location tracking process for inbound airline flights. As illustrated in FIG. 6, various airplanes 601, 603, and 605 have landed at an arriving airport carrying baggage 607, 609, and 611, respectively. This baggage is then unloaded onto baggage transport vehicles 619, 621, at 623, respectively. Baggage code readers 613, 615, and 617 are located and configured to scan the unique baggage code associated with each piece of baggage, respectively, when each piece of baggage is removed from an airplane and/or loaded on a baggage transport vehicle. Each reader may be attached to an airplane, hand carried by baggage handling personnel, attached to a baggage transport vehicle, and/or placed elsewhere. The baggage location notification system 109 may be configured to issue one or more notifications when each piece of baggage has departed from an airplane, as detected by a baggage code reader, indicating that the baggage has departed from the airplane.

Each piece of baggage is then transported by a baggage transport vehicle to a baggage sorting area 631. Baggage code readers 625, 627, and 629 are located and configured to scan the unique baggage code associated with each piece of baggage, respectively, when each piece of baggage arrives at the baggage sorting area 631. Each reader may be attached to the baggage transport vehicle, a conveyor system, carried by baggage sorting personnel, and/or placed elsewhere. The baggage location notification system 109 may be configured to issue one or more notifications when each piece of baggage has arrived at the baggage sorting area 631, as detected by a baggage code reader, indicating that the baggage has arrived at the baggage sorting area.

The baggage is then sorted and departs from the baggage sorting area 631 by conveyor, baggage transport vehicle, or otherwise. Baggage code readers 633, 635, and 637 are located and configured to scan the unique baggage code associated with each piece of baggage, respectively, when each piece of baggage leaves the baggage sorting area 631. Each reader may be attached to a conveyor, a baggage transport vehicle, hand carried by baggage sorting personnel, and/or placed elsewhere. The baggage location notification system 109 may be configured to issue one or more notifications when each piece of baggage leaves the baggage sorting area 631, as detected by a baggage code reader, indicating that the baggage has left the baggage sorting area.

The baggage then arrives at the baggage pickup area. Baggage code readers 639, 641, and 643 are located and configured to scan the unique baggage code associated with each piece of baggage, respectively, when each piece of arrives at the baggage pickup area 645, 647 or 649. Each reader may be attached to a conveyor, a baggage transport vehicle, hand carried by baggage sorting personnel, and/or placed elsewhere. The baggage location notification system 109 may be configured to issue one or more notifications when each piece of baggage arrives at the baggage pick up area, as detected by a baggage code reader, indicating that the baggage has arrived at the baggage pickup area.

Each piece of baggage may then be picked up by a passenger and taken out of the airport through a passenger exit, such as a passenger exit 655. A baggage code reader, such as a baggage code reader 653, may be located and configured to scan the unique baggage code associated with each piece of baggage when each piece of baggage travels through a passenger exit. Each reader may be attached to an exit doorway, hand carried by exit security personnel, and/or placed elsewhere. The baggage location notification system 109 may be configured to issue one or more notifications when each piece of baggage exits the airport, as detected by a baggage code reader, indicating that the baggage has exited the airport.

The system could be configured to require that a bag be received at one location within a pre-determined time after the bag is detected or otherwise present at another location. If the bag is not detected at the subsequent location within this pre-determined time, the system could be configured to automatically issue an alert indicating the failure to have received the bag at the subsequent location within the pre-determined deadline.

FIGS. 7A-7E illustrate examples of notifications that are sequentially issued by the baggage tracking and notification system 101 at different stages of the tracking process for an incoming airline flight. FIG. 7A illustrates an example of a notification that is issued when the baggage has just departed an airplane; FIG. 7B illustrates an example of a notification that is issued when the baggage has just arrived at a baggage sorting area; FIG. 7C illustrates an example of a notification that is issued when the baggage has just departed the baggage sorting area; FIG. 7D illustrates an example of a notification that is issued when the baggage has just arrived at the baggage pickup area; and FIG. 7E illustrates an example of a notification that is issued when the baggage has just departed the airport.

In some embodiments, alerts may be triggered and sent as separate notifications to the passenger (and/or other party associated with the passenger) in a manner set by the passenger. For example, each area may have an associated predetermined time period. This time period can be static or may change as travel-dependent and airport-dependent conditions (weather, delay of the flight, size of airport/baggage handling system, number of baggage handling personnel on duty) change. In the latter case, the time period may be changed, e.g., by the airline automatically. If the system determines that the time period for the baggage remaining in a particular area has been exceeded (e.g., by failing to detect the baggage arriving in the next area), an alert to this effect may be generated and sent to the passenger and/or airline. Similarly, to minimize the possibility of the baggage being removed, accidentally or on purpose, from the airport by someone other than the passenger/authorized agent (e.g., as many bags look the same) and an alert may be generated when the baggage traverses the passenger exit. This alert may be a separate notification that is independent of any notification provided through selection in the passenger notification options shown in FIG. 3, may be preset and unable to be deselected through selection in the passenger notification options, and/or may be deactivated by the passenger. In this last case, the ability of the passenger to deactivate the alert may be limited to a particular time period, such as only after the flight lands or the baggage arrives at the baggage pickup area.

Additionally, the notification may provide an estimate to get to one or more subsequent locations along the trip. For example, a notification that baggage is leaving the plane may include an estimate that it will take 15 minutes for the baggage to reach the baggage pickup area. The estimates may be provided for baggage travel between the locations selected by the user or for predetermined locations, either between a user-selected initial location and a predetermined location or between predetermined locations independent of the user selection. For example, if the user has selected notification when the baggage is leaving the plane, an estimate for arrival at the baggage sorting area may also be included in the notification even if the user has not selected a notification for when the baggage has arrived at the baggage sorting area. Thus, multiple estimates may be provided in a single notification. The estimates may be predetermined, e.g., by the airline, and may be changed as above due to travel-dependent and airport-dependent conditions changing.

Although not shown, each airline may be independently provided with notifications. This is to say that each airline may use the same system (perhaps in addition to or in place of using another tracking system) to provide notifications at all available locations to itself or a third-party tracking agency. This allows the airline to have in depth real time detail baggage movement even though the passenger may only desire limited notifications—such as the baggage arriving at the airplane and at the baggage pickup area. It also allows the airline to determine problem points in the baggage handling system and dispatch resources to solve these problems.

The baggage tracking and notification system 101 may be implemented with a computer system configured to perform the functions that have been described herein for the system and each of its components. Each computer system includes one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system may include one or more computers at the same or different locations. When at different locations, the computers may be configured to communicate with one another through a wired and/or wireless network communication system. The various readers that have been described may be configured to communicate with a network system either through wired or wireless connections or a combination of them.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one more of the functions of the computer system, as recited herein. Each function that is performed by an algorithm also constitutes a description of the algorithm. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, the baggage tracking and notification system 101 may be implemented by using cloud-based software as a service. This may allow for a generic implementation which can be used irrespective of airline or airport. In this case, different travel booking websites can provide additional information regarding flights that would include baggage claim information based on past history, such as the last seven or 30 days (e.g., weekly, monthly, quarterly or annually). It may allow travelers to decide if they should book a flight from this or other airlines/airport, or how much time they should take into account to finish their work in order to catch next flight.

The system may be monetized on the basis of how frequently the passenger wishes to receive notifications, with more frequent notifications costing a decreasing amount. The monetization may also be tied to the passenger's messaging (cellular phone) service and/or relationship with the particular airline. For example, a passenger may be able to use a nominal amount of frequent flyer miles to pay for the notifications. Alternately, notifications may be included in a separate package (such as upgrading seats to those having more leg room or a reduced change fee package) or free as a reward for passengers with gold or platinum (or similar) status with the airline. In these cases, the airline may have a deal with various carriers to provide such notifications at a reduced cost or the like.

A flight may be equipped with WiFi access points, for example. Bags may have identification systems that broadcast beacon messages that a WiFi access point on the flight are able to listen to. Alternatively, the identification systems may respond to the broadcast beacon messages from the WiFi access point, signaling the WiFi access point. The beacon message/response may be sporadic as the identification systems may only be provided with power intermittently to conserve battery life. The passenger may then be able to confirm the presence of luggage on his/her flight (e.g., in the fuselage/cargo section) while sitting in his/her seat. The information may be pushed or provided on-demand. This may be useful in instances when the passenger does not receive notification for some reason. The passenger may then request it during the flight via the WiFi access point.

A mobile device being carried by a passenger may also be configured to request the current status of the passenger's baggage via an application on his/her mobile device. On request, the system may provide the information about the last point at which one of the readers registered that bag identification.

The information that is gathered by the readers may be used to determine the overall baggage-handling performance of an airport, an airline, and/or baggage handling personnel.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this specification are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to these corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended to or should be interpreted to cause a dedication of any component, step, feature, object, benefit, advantage, or equivalent to the public, regardless of whether it is or is not recited in the claims.

The terms and expressions used herein have the ordinary meaning accorded to such terms and expressions in their respective areas, except where specific meanings have been set forth. Relational terms such as first and second and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by "a" or "an" does not, without further constraints, preclude the existence of additional elements of the identical type.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure is not to be interpreted as requiring that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as separately claimed subject matter.

The invention claimed is:

1. An airport baggage tracking and notification system comprising:
   a baggage tracking system configured to track when baggage at an airport has arrived at and has departed from each of a first plurality of locations located within a departure airport and a second plurality of locations located within an arrival airport; and
   a baggage location notification system configured to cause a notification, indicating that a piece of baggage has arrived at or departed from at least one of the locations, to be automatically sent to a mobile device of a passenger associated with the piece of baggage contemporaneously with when the piece of baggage has respectively arrived at or departed from the at least one location,
   wherein the baggage location notification system includes a passenger interface configured to display:
      a plurality of mobile device delivery options as selectable options to the passenger which allows the passenger to specify a mobile device delivery option for sending the notifications to the mobile device of the passenger,
      the first plurality of locations as selectable options to the passenger which allows the passenger to specify when the notification is to be sent by allowing the passenger to select a location from among the first plurality of locations in the departure airport, select whether the notification should be sent upon arrival of the piece of baggage at the selected location in the departure airport, and select whether the notification should be sent upon departure of the piece of baggage from the selected location in the departure airport,
      the second plurality of locations as selectable options to the passenger which allows the passenger to specify when the notification is to be sent by allowing the passenger to select a location from among the second plurality of locations in the arrival airport, select whether the notification should be sent upon arrival of the piece of baggage at the selected location in the arrival airport, and select whether the notification should be sent upon departure of the piece of baggage from the selected location in the arrival airport, and
      a plurality of other notification recipients as selectable options to the passenger which allows the passenger to specify other recipients to receive the sent notifications.

2. The airport baggage tracking and notification system of claim 1 wherein the selected location from among the first plurality of locations or the selected location from among the second plurality of locations specified through the passenger interface is a location within at least one of an airplane, a baggage pickup area, a baggage sorting area and a passenger exit from the departure or arrival airport.

3. The airport baggage tracking and notification system of claim 2 wherein:
   the baggage tracking system is configured to track when the piece of baggage has arrived at and departed from the baggage sorting area; and
   the baggage location notification system is configured to cause a notification to be automatically sent to the passenger contemporaneously with when the piece of baggage has:
      arrived at the baggage sorting area, the notification indicating that the piece of baggage has arrived at the baggage storage area; or
      departed from the baggage sorting area, the notification indicating that the piece of baggage has departed from the baggage storage area.

4. The airport baggage tracking and notification system of claim 1 wherein an alert is sent to the passenger when the piece of baggage has not reached the selected location from among the plurality of first locations or the selected location from among the second plurality of locations specified within a predetermined amount of time.

5. The airport baggage tracking and notification system of claim 4 wherein the predetermined amount of time automatically changes based on at least one of travel conditions and airport conditions.

6. The airport baggage tracking and notification system of claim 4 wherein the predetermined amount of time is determined by estimating a travel time of the piece of baggage from a departure location specified through the passenger interface to an arrival location specified through the passenger interface.

7. The airport baggage tracking and notification system of claim 1 wherein the baggage location notification system is configured to cause the notification to be automatically sent to at least one of the plurality of other notification recipients selected by the passenger, the notification being automatically sent contemporaneously with when the piece of baggage has arrived at or departed from the selected location from among the plurality of locations.

8. The airport baggage tracking and notification system of claim 1 wherein the baggage location notification system is configured to cause the notification to be delivered in the form of a posting to a social networking system associated with the passenger.

9. The airport baggage tracking and notification system of claim 1 wherein:
   the baggage tracking system is configured to track when the piece of baggage has arrived at or departed from at least one of the first plurality of locations in the departure airport and at least one of the second plurality of locations in the departure airport along a single trip; and
   the baggage location notification system is configured to cause a notification, indicating that the piece of baggage has arrived at or departed from the at least one of the first plurality of locations in the departure airport and the at least one of the second plurality of locations in the departure airport, to be automatically delivered to the passenger contemporaneously with when the piece of baggage has respectively arrived at or departed from each respective location.

10. The airport baggage tracking and notification system of claim 1, wherein each location from among the first plurality of locations or the selected location from among the second plurality of locations includes a reader at an entrance of the location to track when the piece of baggage has arrived at the location, and a reader at an exit of the location to track when the piece of baggage has departed from the location.

11. The airport baggage tracking and notification system of claim 1, wherein the passenger interface is configured to display baggage handling history information for the airport, or for an airline located at the airport.

12. A method of tracking baggage at an airport comprising:
   tracking when baggage has arrived and has departed from each of a first plurality of locations located within a departure airport and a second plurality of locations within an arrival airport by electronically or optically reading a unique code that is associated with a piece of baggage;

displaying on a passenger interface:
- a plurality of mobile device delivery options as selectable options to a passenger which allows the passenger to specify a mobile device delivery option for sending the notifications to the mobile device of the passenger,
- the first plurality of locations as selectable options on a passenger interface, when an electronic notification is to be sent to the passenger by allowing the passenger to select a location of the first plurality of locations in the departure airport, and whether the notification should be sent upon arrival of the piece of baggage at the selected location in the departure airport, and select whether the notification should be sent upon departure of the piece of baggage from the selected location in the departure airport;
- the second plurality of locations as selectable options on a passenger interface, when an electronic notification is to be sent to the passenger by allowing the passenger to select a location of the second plurality of locations in the arrival airport, and select whether the notification should be sent upon arrival of the piece of baggage at the selected location in the arrival airport, and select whether the notification should be sent upon departure of the piece of baggage from the selected location in the arrival airport;
- a plurality of other notification recipients as selectable options to the passenger which allows the passenger to specify other recipients to receive the sent notifications; and issuing an electronic notification to a mobile device of the passenger associated with the piece of baggage indicating that the piece of baggage has arrived at or departed from the selected location from among the first plurality of locations or the selected location from among the second plurality of locations contemporaneously with and automatically when the piece of baggage has arrived at or departed from the selected location from among the first plurality of locations or the selected location from among the second plurality of locations, respectively.

13. The method of claim 12 wherein:
the tracking tracks when the piece of baggage has arrived at or departed from the selected location from among the first plurality of locations or the selected location from among the second plurality of locations; and the issuing a notification causes a notification to be automatically sent to the passenger indicating that the piece of baggage has arrived at or departed from the selected location from among the first plurality of locations or the selected location from among the second plurality of locations contemporaneously with when the piece of baggage has arrived at or departed from the selected location from among the first plurality of locations or the selected location from among the second plurality of locations, respectively.

14. The method of claim 12 wherein the notification is sent to the passenger in a manner specified by the passenger.

15. The method of claim 12 further comprising issuing a notification to the passenger indicating that the piece of baggage has remained at the selected location from among the first plurality of locations or the selected location from among the second plurality of locations for more than a pre-determined time when the piece of baggage has remained at the selected location from among the first plurality of locations or the selected location from among the second plurality of locations for more than the pre-determined time.

16. The method of claim 12 wherein the selected location from among the first plurality of locations or the selected location from among the second plurality of locations is a passenger exit from the departure or arrival airport.

17. The method of claim 12 wherein the notification includes an estimated amount of time for the piece of baggage to arrive at a subsequent location from among the first plurality of locations or the a subsequent location from among the second plurality of locations selected by the user.

18. The method of claim 12 wherein the notification is issued when the piece of baggage arrives at the selected location from among the first plurality of locations or the selected location from among the second plurality of locations and includes an estimated amount of time for the piece of baggage to remain at the selected location from among the first plurality of locations or the selected location from among the second plurality of locations.

* * * * *